(12) United States Patent
Manning et al.

(10) Patent No.: US 10,602,201 B2
(45) Date of Patent: Mar. 24, 2020

(54) SYSTEMS AND METHODS FOR IDENTIFYING A SPORTS PLAYER OF INTEREST TO A USER DESPITE THE USER BEING DISINTERESTED IN THE PLAYER'S ATHLETIC ACCOMPLISHMENTS

(71) Applicant: Rovi Guides, Inc., San Carlos, CA (US)

(72) Inventors: Scott Manning, Lansdowne, PA (US); Jeffrey Glahn, Malvern, PA (US); Kyle Smetanka, Philadelphia, PA (US); Evangeline Castaneda, West Chester, PA (US)

(73) Assignee: Rovi Guides, Inc., San Jose, CA (US)

( * ) Notice: Subject to any disclaimer, the term of this patent is extended or adjusted under 35 U.S.C. 154(b) by 304 days.

(21) Appl. No.: 15/810,610

(22) Filed: Nov. 13, 2017

(65) Prior Publication Data

US 2019/0149854 A1    May 16, 2019

(51) Int. Cl.
| | | |
|---|---|---|
| *H04N 21/235* | (2011.01) | |
| *H04N 21/258* | (2011.01) | |
| *H04N 21/4722* | (2011.01) | |
| *H04N 21/234* | (2011.01) | |

(52) U.S. Cl.
CPC ..... *H04N 21/235* (2013.01); *H04N 21/23418* (2013.01); *H04N 21/25866* (2013.01); *H04N 21/4722* (2013.01)

(58) Field of Classification Search
CPC .................................................. H04N 21/235
USPC ....................................................... 725/114
See application file for complete search history.

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |
| 6,685,479 B1 | 2/2004 | Ghaly |
| 7,165,098 B1 | 1/2007 | Boyer et al. |
| 7,761,892 B2 | 7/2010 | Ellis et al. |
| 7,949,722 B1* | 5/2011 | Ullman ................. G06Q 30/02 709/217 |
| 8,046,801 B2 | 10/2011 | Ellis et al. |
| 2002/0174430 A1 | 2/2002 | Ellis et al. |
| 2005/0251827 A1 | 7/2005 | Ellis et al. |
| 2007/0233569 A1* | 10/2007 | Kelley ............... G06Q 30/0269 705/14.66 |
| 2008/0010106 A1* | 1/2008 | Bourne ................. G06Q 10/10 705/7.18 |

(Continued)

*Primary Examiner* — Mushfikh I Alam
(74) *Attorney, Agent, or Firm* — Haley Guiliano LLP

(57) ABSTRACT

Systems and methods are provided herein for connecting a user with a sports competitor whose athletics the user is not interested in, but with whom the user shares a personal connection. In some embodiments, a media guidance application determines that a user is viewing playback of a media asset comprising a sporting event, identifies competitors featured in the sporting event, and retrieves, from a information identifying competitors in which the user is interested. The media guidance application determines therefrom competitors featured in the sporting event in which the user is not interested, and compares interests of the user that are not commonly shared by a general population to interests of the determined competitors. An uncommon interest is identified as common between a competitor and the user, and the user is provided an option to perform an action associated with the competitor.

20 Claims, 8 Drawing Sheets

(56) References Cited

U.S. PATENT DOCUMENTS

| | | | |
|---|---|---|---|
| 2009/0082111 A1* | 3/2009 | Smith | G06Q 30/02 |
| | | | 463/42 |
| 2009/0099924 A1* | 4/2009 | Lensch | G06Q 10/101 |
| | | | 705/14.13 |
| 2009/0198666 A1* | 8/2009 | Winston | G06Q 50/01 |
| 2010/0153885 A1 | 6/2010 | Yates | |
| 2012/0324004 A1* | 12/2012 | Le | G06Q 10/00 |
| | | | 709/204 |
| 2013/0268512 A1* | 10/2013 | Snyder | G06Q 10/06 |
| | | | 707/722 |
| 2015/0347598 A1* | 12/2015 | Bari | G06F 16/9535 |
| | | | 707/732 |
| 2016/0301953 A1* | 10/2016 | Garcia Navarro | H04N 21/2353 |

* cited by examiner

700

702
Begin Subroutine for Determining, Based on the First Plurality of Competitors and the Second Plurality of Competitors, the Third Plurality of Competitors Featured in the Sporting Event in Which the User is Not Interested

704
Determine a Union Between the First Plurality of Competitors and the Second Plurality of Competitors

706
Determine the Third Plurality of Competitors to Include Each of the Second Plurality of Competitors Except for Those Competitors of the Second Plurality of Competitors that are Within the Determined Union

FIG. 7

SYSTEMS AND METHODS FOR IDENTIFYING A SPORTS PLAYER OF INTEREST TO A USER DESPITE THE USER BEING DISINTERESTED IN THE PLAYER'S ATHLETIC ACCOMPLISHMENTS

BACKGROUND

In the related art, a user may be recommended to follow or otherwise learn more about a sports player in whom the user is interested. For example, if a user adds a sports player to a fantasy sports roster, related art systems may notify the user as to news relating to the sports player. However, if a user is not interested in a sports player, the related art systems would not provide news about the sports player that would be interesting to the user.

SUMMARY

Systems and methods are disclosed herein for connecting a user with a sports competitor whose athletics the user is not interested in, but with whom the user shares a personal connection. For example, if the competitor plays for a team that the user does not like watching, but the competitor happens to contribute to a charity that the user also contributes to, or the competitor happened to overcome a disease that the user is fighting against, the systems and methods disclosed herein may connect the user with that competitor.

To this end and others, in some aspects of the disclosure, a media guidance application may determine that a user is viewing playback of a media asset comprising a sporting event. For example, the media guidance application may determine that the user is watching a football competition between the New York Giants and the New England Patriots, which are football teams that play in the National Football League ("NFL"). The media guidance application may identify a first plurality of competitors featured in the sporting event (e.g., players on both the New York Giants and the New England Patriots who are participating in the football competition).

In some embodiments, the media guidance application retrieves, from a database including a profile of the sports preferences of the user, information identifying a second plurality of competitors in which the user is interested. For example, if the user cheers for the New York Giants, and thus the media guidance application may retrieve information identifying the starting players for the New York Giants.

In some embodiments, the media guidance application may determine, based on the first plurality of competitors and the second plurality of competitors, a third plurality of competitors that are competitors featured in the sporting event in which the user is not interested (e.g., players in the football competition who are not starters in the football competition). As a non-limiting example, the media guidance application may perform this determination by determining a union between the first plurality of competitors and the second plurality of competitors, and by then determining the third plurality of competitors to include each of the second plurality of competitors except for those competitors of the second plurality of competitors that are within the determined union.

In some embodiments, the media guidance application may retrieve, from a profile of personal interests of the user stored within the database, information relating to personal interests of the user. For example, the media guidance application may retrieve information about a charity that the user contributes to.

The media guidance application may identify, from the information relating to the personal interests of the user, interests that are not commonly shared by a general population. For example, the media guidance application may, for each respective one of the personal interests of the user, determine an amount of profiles of other users that share the respective personal interest, determine whether the amount exceeds a threshold, and, in response to determining that the amount does not exceed the threshold, determine that the respective personal interest is not commonly shared by the general population. Following from this example, if less than a threshold amount of other users contribute to the same charity as the user, the media guidance application may determine that contributing to this charity is not a commonly shared interest by the general population.

In some embodiments, in connection with determining whether the interest is a commonly shared interest by the general population, the media guidance application may determine a geographical region in which the user resides (e.g., New York), and may define defining the general population to consist of users whose profiles reflect that those users also reside within the geographical region (e.g., other users in New York). The media guidance application may determine the amount of profiles of other users that share the respective personal interest by limiting the other users to those users who are also reside within the geographical region, thus limiting the determination as to whether the user's interest in, e.g., contributing to a charity, is uncommon, to comparing the user's interest levels to other users who live locally to the user.

In some embodiments, the media guidance application may determine whether an interest of the interests that are not commonly shared by a general population is shared between the user and a given competitor of the third plurality of competitors. For example, the media guidance application may determine whether a competitor of the football competition that is not a starting player for the New York Giants contributes to the same charity that the user contributes to.

In some embodiments, the media guidance application, when determining whether an interest of the interests that are not commonly shared by the general population is shared between the user and the given competitor of the third plurality of competitors, may retrieve, from profile information corresponding to each competitor of the third plurality of competitors, information indicating interests of each competitor of the third plurality of competitors. The media guidance application may then determine whether an interest of the given competitor matches an interest of the interests that are not commonly shared by the general population, and, in response to determining that the interest of the given competitor matches an interest of the interests that are not commonly shared by the general population, may determine that the interest of the given competitor is shared between the user and the given competitor.

In some embodiments, in response to determining that the interest is shared between the user and the given competitor, the media guidance application may generate for display to the user a selectable option to enable the user to perform an action associated with the given competitor. For example, the media guidance application may generate for display a selectable option for the user to access social media publications by the competitor relating to the charity.

In some embodiments, the media guidance application may determine a plurality of publications relating to both the given competitor and the interest. For example, the media guidance application may determine a plurality of publications that the competitor published to social media that relate to the charity (e.g., "had a great day building houses with #[charity name]"). The media guidance application may detect a selection of the selectable option, and, in response to detecting the selection of the selectable option, may generate for display, to the user, a plurality of links, each link leading to a publication of the plurality of publications (e.g., links to the relevant social media posts).

In some embodiments, the media guidance application may determine plurality of publications comprises by first determining a set of social media publication platforms to which the given competitor subscribes. The media guidance application may then identify, for each social media publication platform of the set of social media publication platforms, publications authored by the given competitor. The media guidance application may determine a subset of the publications authored by the given competitor that relate to the interest, and may determine the plurality of publications relating to both the given competitor and the interest to be the subset of the publications authored by the given competitor that relate to the interest.

In some embodiments, the media guidance application may monitor a degree to which the user interacts with each link of the plurality of links, and, in response to determining that the degree to which the user interacts with each link of the plurality of links exceeds a threshold, the media guidance application may expand the plurality of links to include links leading to additional publications that relate to the given competitor, but do not relate to the interest. For example, if the media guidance application determines that the user has read a large amount of social media publications made by the competitor about the charity, the media guidance application may offer the user links to news articles about other accomplishments by the competitor.

In some embodiments, when identifying, from the information relating to the personal interest of the user, interests that are not commonly shared by the general population, the media guidance application ma determine a disability that has afflicted the user (e.g., the user tore a patellar tendon when playing football). The media guidance application, when determining whether an interest of the interests that are not commonly shared by the general population is shared between the user and the given competitor of the third plurality of competitors, may access an injury report relating to injuries that have afflicted the third plurality of competitors. The media guidance application may determine that an injury mentioned in the injury report matches the disability that has afflicted the user (e.g., that a competitor also had previously dealt with a tear of his patellar tendon). The media guidance application may receive a selection of the selectable option, and, in response to receiving the selection of the selectable option, may generate for display information relating to the given competitor's handling of the injury (e.g., news articles relating to the competitor overcoming the injury to his patellar tendon).

In some embodiments, the media guidance application may determine whether the given competitor overcame the injury. In response to determining that the given competitor overcame the injury, the media guidance application may determine a treatment for the injury that the given competitor had received. The media guidance application may then recommend the treatment to the user.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 depicts a flowchart of an illustrative process for determining a plurality of competitors featured in a sporting event in which the user is not interested, in accordance with some embodiments of the disclosure;

DETAILED DESCRIPTION

Figure 1:
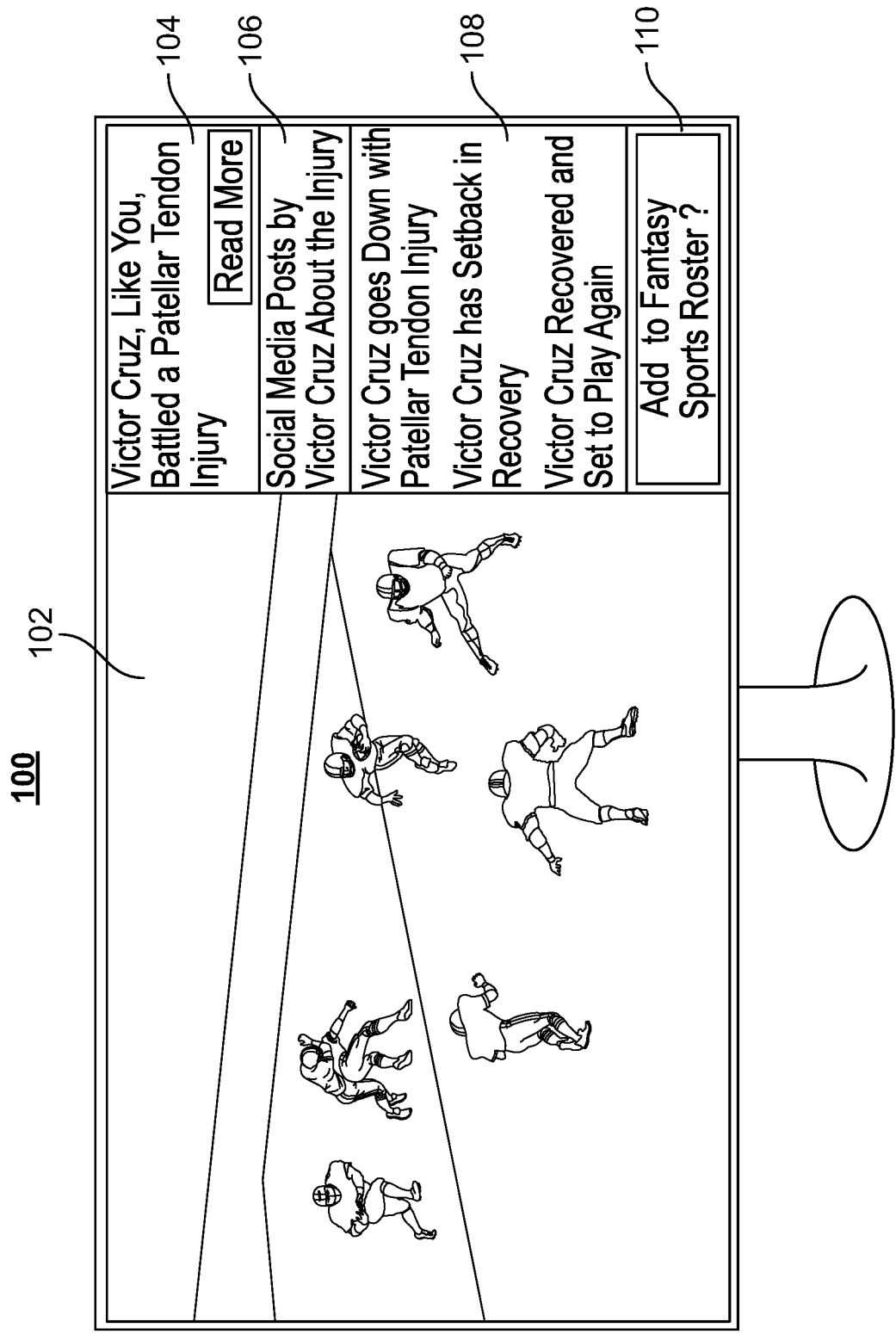
FIG. 1 shows illustrative user equipment including a display of a media asset and information relating to a competitor, in accordance with some embodiments of the disclosure.

FIG. 1 shows illustrative user equipment including a display of a media asset and information relating to a competitor, in accordance with some embodiments of the disclosure. FIG. 1 depicts user equipment 100. A media guidance application is causing media asset 102 to be generated for display on a screen of user equipment 100. Media asset 102 may be a sports competition—as shown in FIG. 1, media asset 102 is a football competition. While FIG. 1 shows user equipment 100 being a television with a television screen for displaying information, this is merely for illustrative purposes. User equipment 100 may be any user equipment described below with respect to FIGS. 2-5, and media asset 102 may be displayed on any display described below with respect to FIGS. 2-5. The media guidance application is executed by control circuitry, also described below with respect to FIGS. 2-5, which may reside in whole or in part within user equipment 100, or may reside in whole or in part in equipment remote from the user equipment, or some combination of the two.

As depicted in FIG. 1, the media guidance application may generate for display selectable option 104, which may comprise information about a competitor playing in media asset 102. In response to receiving a selection of selectable option 104, the media guidance application may generate for display social media option 106, links to news articles 108, and/or fantasy roster option 110. Details relating to these options will be described below.

In some aspects of the disclosure, the media guidance application may determine that a user is viewing playback of media asset 102, which may be a sporting event. For example, the media guidance application may determine that the user is watching a football competition between the New York Giants and the New England Patriots.

The media guidance application may identify a first plurality of competitors featured in the sporting event (e.g., players on both the New York Giants and the New England Patriots who are participating in the football competition). In some embodiments, the media guidance application may identify the first plurality of competitors based on information received with media asset 102 (e.g., information in a vertical blanking interval, auxiliary information received over an Internet connection, or any other form of supplemental content received with media asset 102). In some embodiments, the media guidance application may identify the first plurality of competitors by accessing a database including one or more entries that indicate the competitors (e.g., a team website that indicates a current roster of competitors on the team). Manners of accessing data (e.g., from local storage or from a remote site) are described in further detail below with respect to FIGS. 2-5.

In some embodiments, the media guidance application retrieves, from a database including a profile of the sports preferences of the user, information identifying a second plurality of competitors in which the user is interested. For example, the media guidance application may access local storage of user equipment 100, or storage at different user equipment or a remote database. The media guidance application may request information relating to a profile of the user. The media guidance application may responsively receive information relating to sports teams and/or competitors in which the user is interested. The information may have been input expressly by the user (e.g., the user indicating that he enjoys the New York Giants on his social media page), or impliedly by the user (e.g., the media guidance application detects that the user regularly views competitions in which the New York Giants play).

In some embodiments, the media guidance application may determine that a user has express preferences for certain competitors. For example, the media guidance application may determine that the user prefers Eli Manning, a competitor on the New York Giants team. Again, the media guidance application may make this determination based on express input or based on implied input (e.g., the user purchases Eli Manning paraphernalia, such as a jersey, or routinely publishes content on social media relating to Eli Manning). In some embodiments, the media guidance application may determine, based on a determined preference for a team, that the user is interested in the competitors of that team. For example, the media guidance application may determine based on a determined user preference for the New York Giants team that the user prefers starting players, or all players, of the New York Giants.

In some embodiments, the media guidance application may determine, based on the first plurality of competitors and the second plurality of competitors, a third plurality of competitors that are competitors featured in the sporting event in which the user is not interested. In other words, the media guidance application may determine a plurality of competitors of media asset 102 in which the user is not typically interested, but may be interested in if the user had known about a trait about one of the competitors that is shared by the user.

In some embodiments, the media guidance application may perform this determination by determining a union between the first plurality of competitors and the second plurality of competitors. For example, the media guidance application may determine all competitors corresponding to media asset 102, and may form a union between those competitors and competitors that the user prefers, to determine a set of competitors in media asset 102 that the user prefers. The media guidance application may then determine the third plurality of competitors to include each of the second plurality of competitors except for those competitors of the second plurality of competitors that are within the determined union, thus resulting in a set of competitors in media asset 102 that the user does not already prefer. As an alternate embodiment, the media guidance application may initially limit its determination of players that the user prefers to a determination of players corresponding to media asset 102. The media guidance application may thus, to determine the third plurality of competitors, simply filter those determined players out of the known set of players corresponding to media asset 102.

In some embodiments, the media guidance application may retrieve, from a profile of personal interests of the user stored within the database, information relating to personal interests of the user. The media guidance application may identify, from the information relating to the personal interests of the user, interests that are not commonly shared by a general population. As used herein, the term "interests that are not commonly shared by a general population" is defined to mean an interest that is shared, on some scale, with a small number of other people. For example, a preference for chicken is a preference held by a vast majority of the population, whereas an interest in the cure for a rare disease that afflicts a user is held by a vast minority of the population, and is thus not commonly shared by a general population.

There are a number of ways that the media guidance application can compute whether an interest is commonly shared or not by a general population. For example, the media guidance application may, for each respective one of the personal interests of the user, determine an amount of profiles of other users that share the respective personal interest, determine whether the amount exceeds a threshold, and, in response to determining that the amount does not exceed the threshold, determine that the respective personal interest is not commonly shared by the general population. The threshold may be a static number (e.g., if 100,000 people or less share the interest, then the media guidance application determines that the interest is not commonly shared by the general population).

The term "general population," as used herein, is defined to mean either the human population of the earth, or some definable subset of the human population. A definable subset of the human population is a subset of the population that shares on or more defined attributes. Example definable subsets include women only, residents of Columbus, Ohio, persons between the ages of 13-21, and the like. In some embodiments, the media guidance application may determine a threshold to use in the above-described manner depending on a defined attribute. For example, if the media guidance application determines that the user has an interest in contributing to a charity that is based in New York City, the media guidance application may determine attributes about users who have an interest in contributing to that charity are located (for example, an age range of those users, a geographical location of those users, genders of those users, and the like).

If the media guidance application determines that users are homogeneous, or nearly homogeneous, with respect to one or more attributes (e.g., all users who contribute to that charity are from New York), the media guidance application may define the general population to be users who share that attribute (e.g., all users in New York). The media guidance application may then retrieve a threshold that corresponds to that set of people. For example, the threshold might be a defined percentage of people in a defined population. Thus, if 24 million people live in New York, and the threshold is defined to be 1%, then the media guidance application would determine that the interest is not shared with the general population if less than 240,000 people (i.e., 1% of 24 million people) from New York contribute to this Charity. The threshold may be predefined for each attribute or sets of attributes, or may be a static percentage of all users that fall within a given set of attributes.

In some embodiments, the media guidance application may determine whether an interest of the interests that are not commonly shared by a general population is shared between the user and a given competitor of the third plurality of competitors. For example, the media guidance application may determine that the user has been afflicted with, and is interested in healing from, an injury to his patellar tendon, and may determine that this injury is not commonly shared by a general population. The media guidance application may determine interests of each competitor of the third plurality of competitors (e.g., in the manner that the user's interests were determined), and may determine whether an interest of the competitor matches the user's interest that is not commonly shared by a general population (e.g., may have also been afflicted with an injury to his patellar tendon).

In some embodiments, the media guidance application may determine whether the interest of the competitor matches the user's interest by way of a comparison operation, to determine whether the interest of the user matches the interest of the competitor. In some embodiments, the determination of whether the interest of the competitor matches the user's interest may be performed by way of retrieving, from profile information corresponding to each competitor of the third plurality of competitors, information indicating interests of each competitor of the third plurality of competitors. The media guidance application may perform the retrieval information of profile information corresponding to the competitors in a manner similar to that described above of retrieval of other profile information. The media guidance application may then determine whether an interest of the given competitor matches an interest of the interests that are not commonly shared by the general population through a comparison operation, and, in response to determining that the interest of the given competitor matches an interest of the interests that are not commonly shared by the general population, may determine that the interest of the given competitor is shared between the user and the given competitor.

In some embodiments, in response to determining that the interest is shared between the user and the given competitor, the media guidance application may generate for display to the user a selectable option to enable the user to perform an action associated with the given competitor. For example, the media guidance application may generate for display selectable option 104. The media guidance application may cause selectable option 104 to include an identifier of the given competitor (e.g., following from the example above about a torn patellar tendon, selectable option 104 may identify Victor Cruz). The media guidance application may also cause selectable option 104 to include an identifier of what the shared interest is (e.g., interest in a torn patellar tendon).

In some embodiments, in response to receiving a selection of selectable identifier 104, the media guidance application may generate for display social media option 106. In order to populate the contents included in social media option 106, the media guidance application may determine a plurality of publications made by the competitor that relate to the interest. For example, Victor Cruz is a football player on the New York Giants who tore his patellar tendon, and may be determined to be the given competitor in accordance with the foregoing. The media guidance application may identify social media platforms that Victor Cruz subscribes to (e.g., Facebook, Twitter), and may identify publications made by Victor Cruz on those social media platforms. Alternatively, or additionally, the media guidance application may identify publications made by other users of the social media platform in connection with the given competitor (e.g., a coach publishing "Victor Cruz has made great strides in connection with his knee injury!").

The media guidance application may determine a subset of the publications that correspond to the interest (e.g., publications relating to Victor Cruz's torn patellar tendon) by identifying keywords relating to a torn patellar tendon, by identifying hashtags including keywords relating to a torn patellar tendon, and the like. For example, the media guidance application may determine a plurality of publications that the competitor published to social media that relate to the injury (e.g., "making major progress on knee injury # bestrong"). The media guidance application may generate for display, in social media option 106, the determined subset of publications. For example, the media guidance application may generate for display the publications themselves, links to the publications, links to publications made on a given social media platform (e.g., Twitter), and the like.

In some embodiments, in response to receiving a selection of selectable identifier 104, the media guidance application may generate for display news option 108. The generation for display of news option 108 may be in addition to, or instead of, the generation for display of social media option 106. The media guidance application may generate for display, within news option 108, links to news publications relating to the competitor's injury. The media guidance application may determine which news publications to link to by crawling news publications for keywords associated with the injury and the competitor, or by referencing an index that catalogs attributes relating to the content of various news articles. The media guidance application may cause selectable option 104 to include separate links to access either social media option 106 or news option 108.

In some embodiments, the media guidance application may monitor a degree to which the user interacts with each link of the plurality of links. For example, the media guidance application may determine an amount of times, and/or a frequency at which, a user selects links within social media option 106 and/or news option 108. The media guidance application may determine that the degree to which the user interacts with each link of the plurality of links exceeds a threshold (e.g., a threshold frequency, or a threshold amount (in the aggregate, or over a predetermined period of time)). The threshold may be predefined or a default value programmed by an editor of the media guidance application, or may be set by the user. In response to such a determination, the media guidance application may expand the plurality of links to include links leading to additional publications that relate to the given competitor, but do not relate to the interest. For example, if the media guidance application determines that the user has read a large amount of social media publications made by the competitor about the injury to Victor Cruz, the media guidance application may offer the user links to news articles about other accomplishments by the competitor. The media guidance application may generate for display these additional links within social media option 106, news option 108, or in a different option that is not depicted in FIG. 1.

In some embodiments, the media guidance application, when determining whether an interest of the interests that are not commonly shared by the general population is shared between the user and the given competitor of the third plurality of competitors, may access an injury report relating to injuries that have afflicted the third plurality of competitors. The media guidance application may determine that an injury mentioned in the injury report matches the disability that has afflicted the user (e.g., that a competitor also had previously dealt with a tear of his patellar tendon). The media guidance application may receive a selection of selectable option 104, and, in response to receiving the selection of selectable option 104, may generate for display information relating to the given competitor's handling of the injury (e.g., news articles relating to the competitor overcoming the injury to his patellar tendon, within news option 108).

In some embodiments, the media guidance application may determine whether the given competitor overcame the injury. In response to determining that the given competitor overcame the injury, the media guidance application may determine a treatment for the injury that the given competitor had received. For example, the media guidance application may crawl the aforementioned news articles and social media publications for publications that relate to a treatment plan for the competitor (e.g., a doctor used, a specific medicine used, and the like). The media guidance application may then recommend the treatment to the user.

In some embodiments, the media guidance application may determine that the user participates in fantasy sports competitions. In response to determining that the user participates in fantasy sports competitions, the media guidance application may generate for display option 110 to add the given competitor to the user's fantasy sports roster. In response to receiving a selection of display option 110, the media guidance application may transmit a command to a fantasy sports application to add the competitor to the user's fantasy sports roster.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
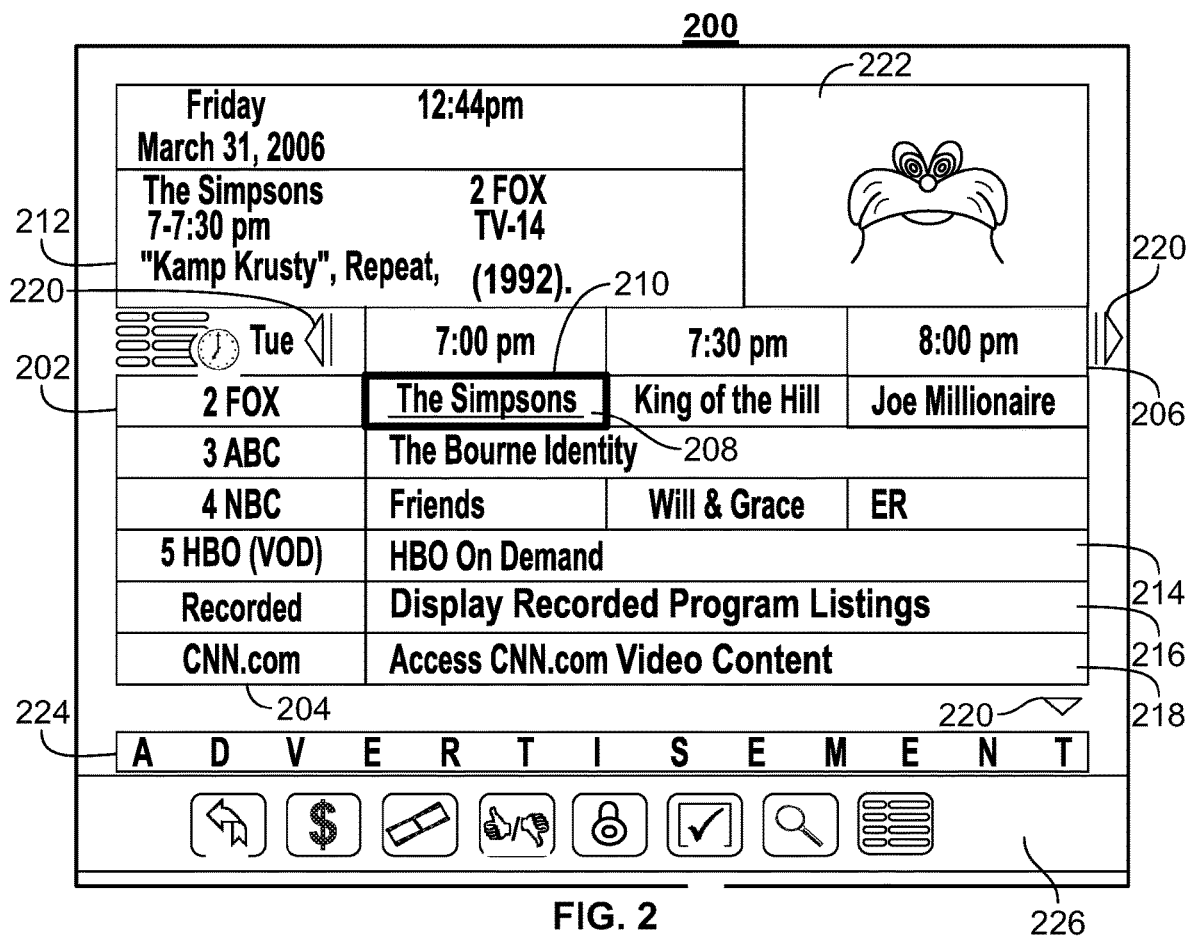
FIGS. 2 and 3 show illustrative examples of display screens generated by a media guidance application, in accordance with some embodiments of the disclosure.
Figure 3:
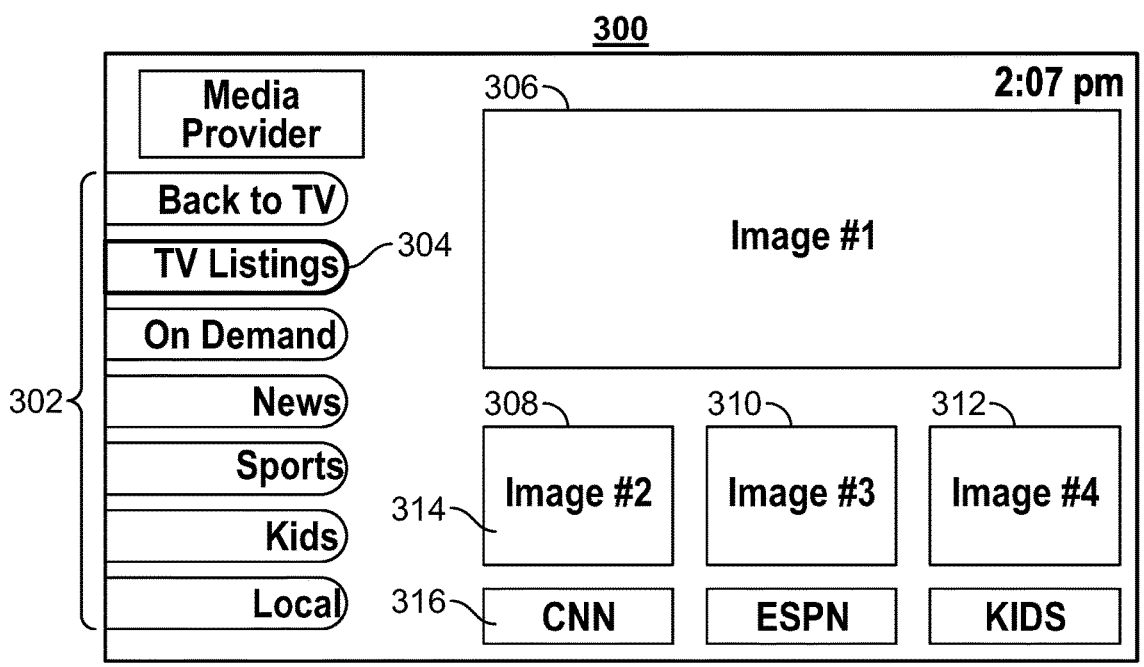

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
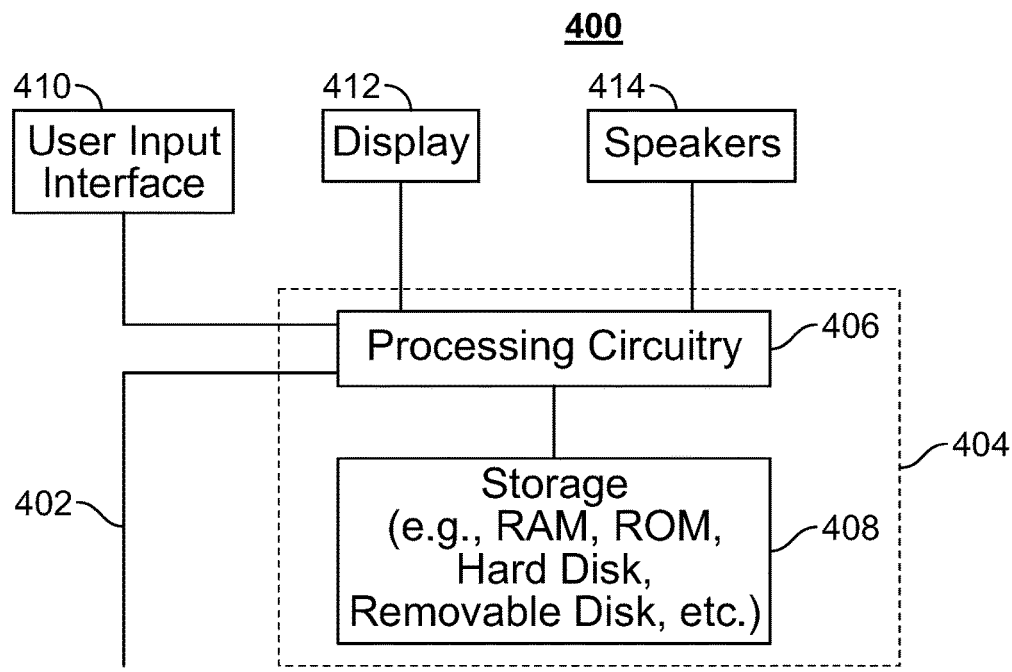
FIG. 4 is a block diagram of an illustrative user equipment device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
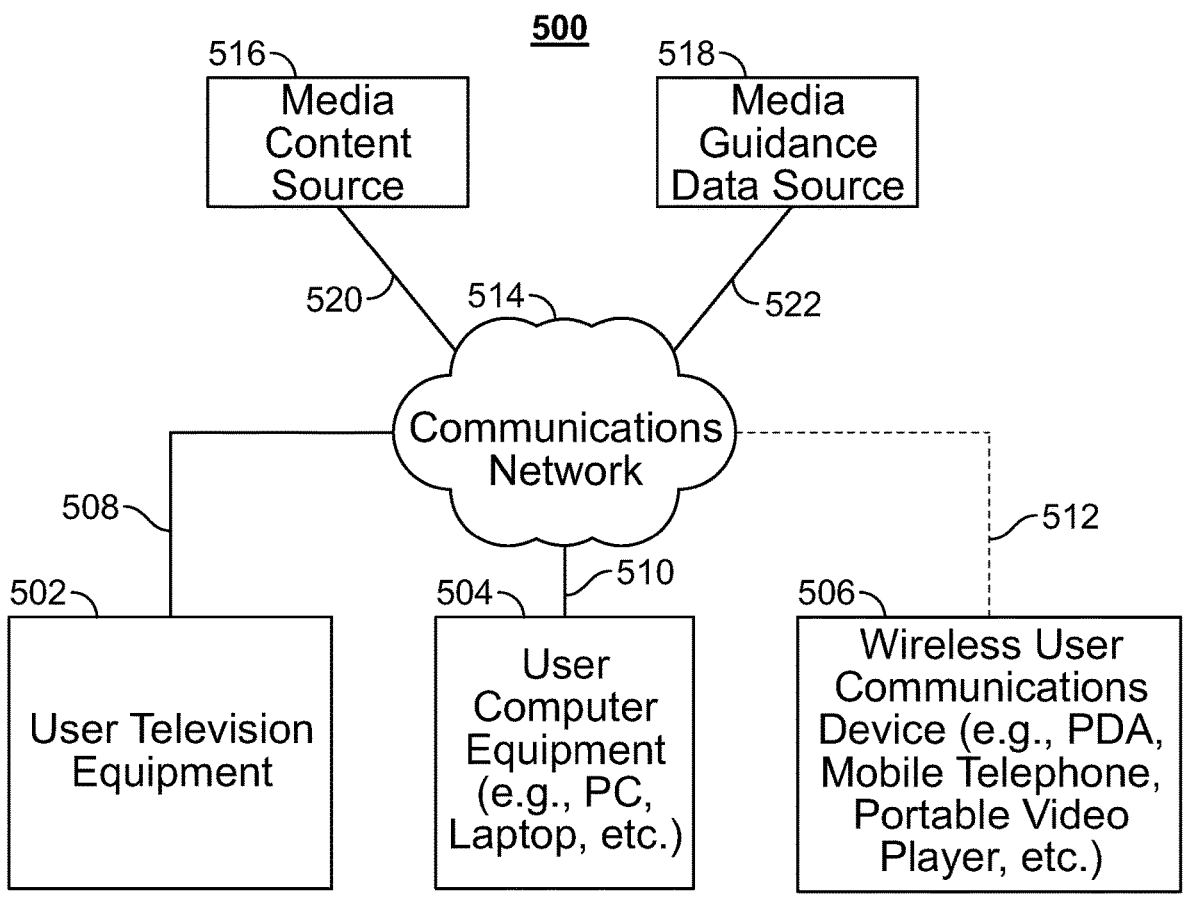
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
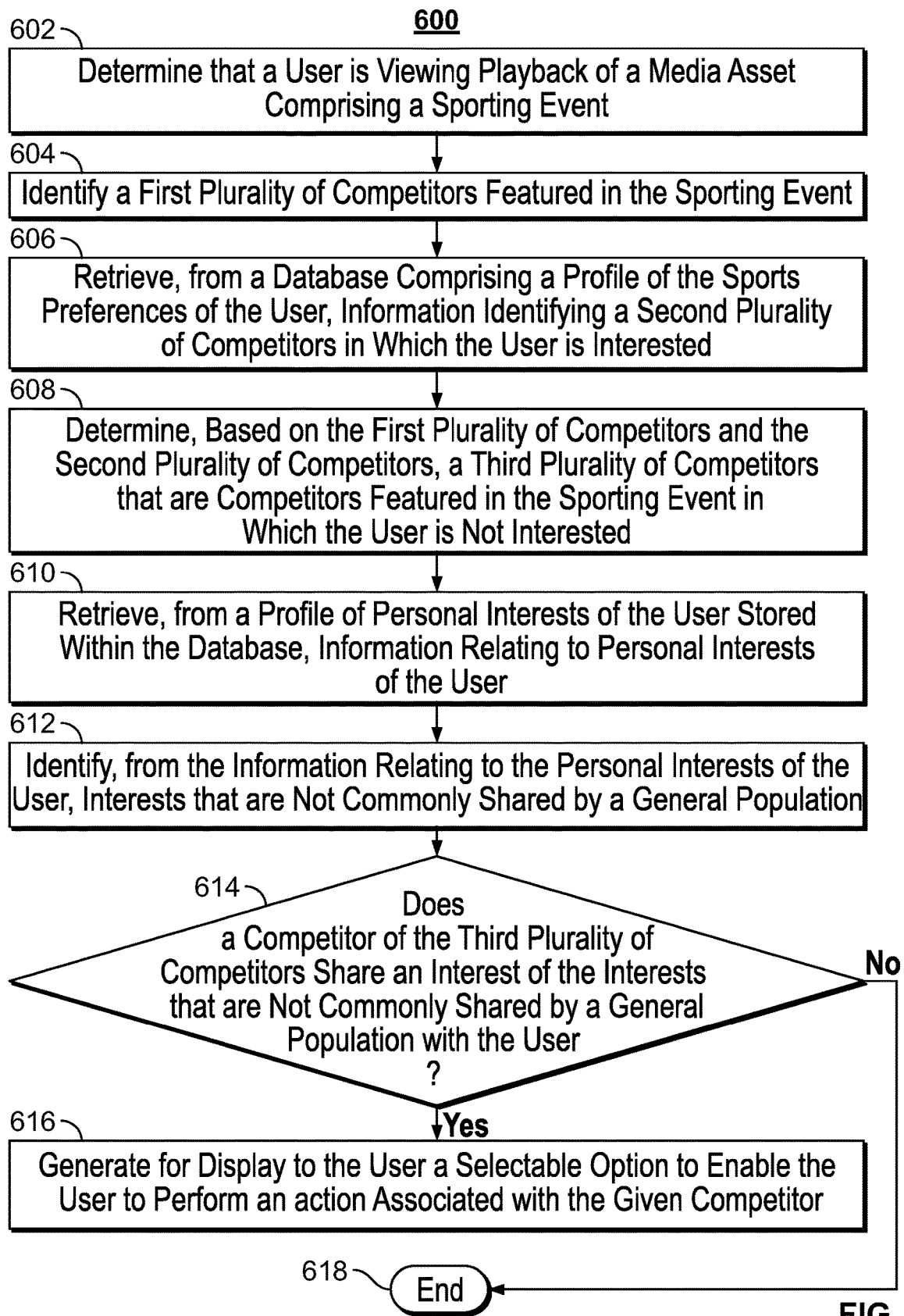
FIG. 6 depicts a flowchart of an illustrative process for connecting a user with a sports competitor whose athletics the user is not interested in, but with whom the user shares a personal connection, in accordance with some embodiments of the disclosure.

FIG. 6 depicts a flowchart of an illustrative process for connecting a user with a sports competitor whose athletics the user is not interested in, but with whom the user shares a personal connection, in accordance with some embodiments of the disclosure. It should be noted that process 600 or any step thereof could be performed on, or provided by, any of the devices shown in FIGS. 4-5. For example, process 600 may be executed by control circuitry 404 (FIG. 4) as instructed by a media guidance application implemented on user equipment 100 (which may have the functionality of any or all of user equipment 502, 504, and/or 506 (FIG. 5)). In addition, one or more steps of process 600 may be incorporated into or combined with one or more steps of any other process or embodiment (e.g., as described in relation to FIGS. 8-10). Many elements of process 600 have been described above with respect to FIG. 1, and those descriptions have full force and effect with respect to the below description of process 600, and thus details on previously-described elements are omitted for the sake of brevity.

Process 600 begins at 602, where control circuitry 404 determines that a user is viewing playback of a media asset (e.g., accessed from media content source 516) comprising a sporting event (e.g., media asset 102, which may be displayed on display 412 of user equipment 100). At 604, control circuitry 404 identifies a first plurality of competitors featured in the sporting event. At 606, control circuitry 404 retrieves, from a database comprising a profile of the sports preferences of the user (e.g., storage 408, and/or media guidance data source 518, which may be accessible to user equipment 100 by way of communications 514), information identifying a second plurality of competitors in which the user is interested.

At 608, control circuitry 404 determines, based on the first plurality of competitors and the second plurality of competitors, a third plurality of competitors that are competitors featured in the sporting event in which the user is not interested. At 610, the control circuitry retrieves, from a profile of personal interests of the user stored within the database (e.g., storage 408, and/or media guidance data source 518, which may be accessible to user equipment 100 by way of communications 514), information relating to personal interests of the user. At 612, control circuitry 404 identifies, from the information relating to the personal interests of the user, interests that are not commonly shared by a general population.

At 614, control circuitry 404 determines whether a competitor of the third plurality of competitors share an interest of the interests that are not commonly shared by a general population with the user. If control circuitry 404 makes a determination in the affirmative process 600 continues to 616, where control circuitry 404 generates for display (e.g., on display 412 of user equipment 100 or of other user equipment (e.g., wireless user communications device 506), to the user a selectable option to enable the user to perform an action associated with the given competitor. If control circuitry 404 makes a determination in the negative, process 600 ends at 618.

FIG. 7 depicts a flowchart of an illustrative process for determining a plurality of competitors featured in a sporting event in which the user is not interested, in accordance with some embodiments of the disclosure. It should be noted that process 700 or any step thereof could be performed on, or provided by, any of the devices shown in FIGS. 4-5. For example, process 700 may be executed by control circuitry 404 (FIG. 4) as instructed by a media guidance application implemented on user equipment 100 (which may have the functionality of any or all of user equipment 502, 504, and/or 506 (FIG. 5)). In addition, one or more steps of process 700 may be incorporated into or combined with one or more steps of any other process or embodiment (e.g., as described in relation to FIGS. 6 and 8-10). Many elements of process 700 have been described above with respect to FIG. 1, and those descriptions have full force and effect with respect to the below description of process 700, and thus details on previously-described elements are omitted for the sake of brevity.

Process 700 begins at 702, where control circuitry 404 begins a subroutine for determining, based on the first plurality of competitors and the second plurality of competitors, the third plurality of competitors featured in the sporting event in which the user is not interested (e.g., a subroutine for executing 608 of process 600). At 704, control circuitry 404 determines a union between the first plurality of competitors and the second plurality of competitors. At 706, control circuitry 404 determines the third plurality of competitors to include each of the second plurality of competitors except for those competitors of the second plurality of competitors that are within the determined union.

Figure 8:
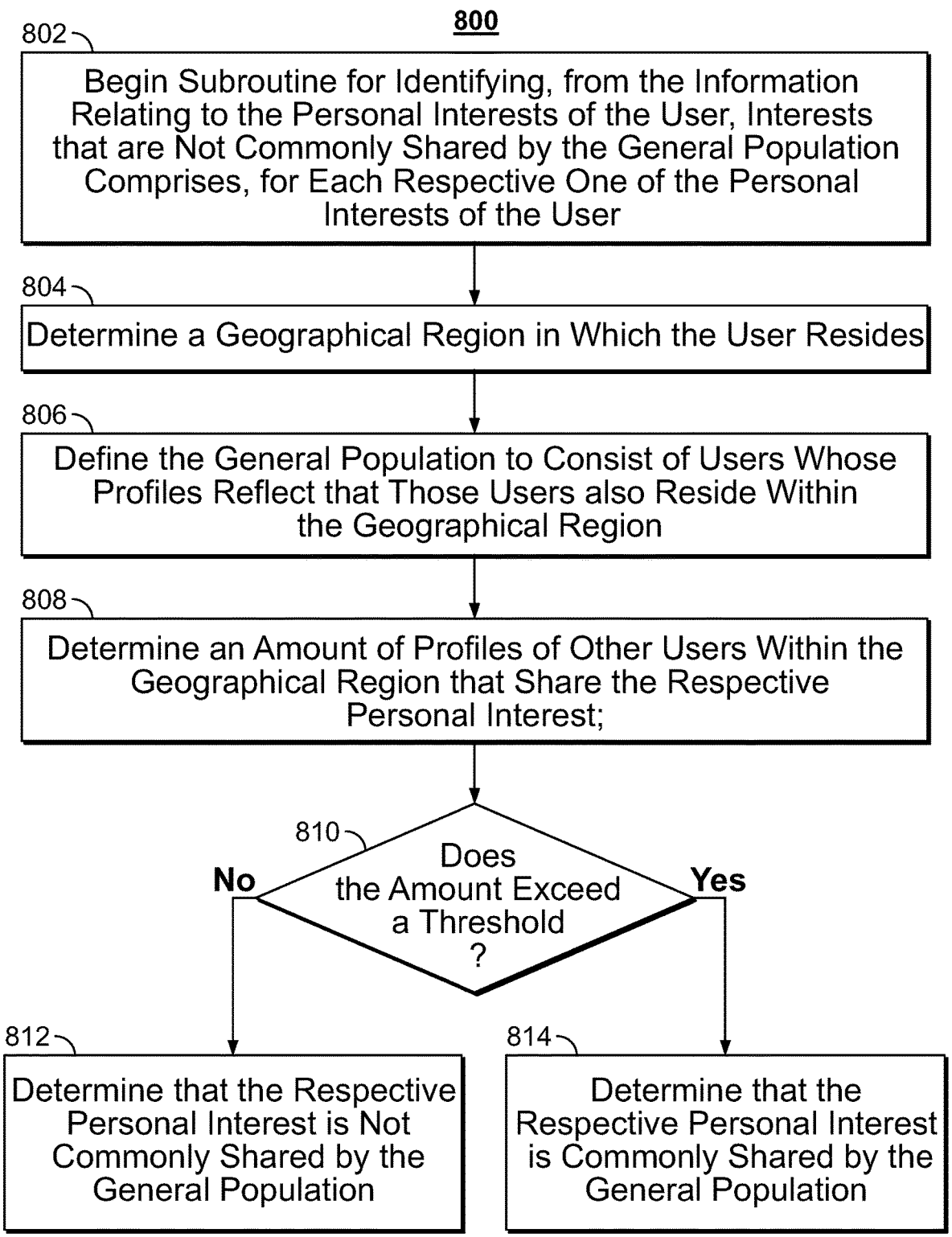
FIG. 8 depicts a flowchart of an illustrative process for identifying interests that are not commonly shared by the general population with the user, in accordance with some embodiments of the disclosure.

FIG. 8 depicts a flowchart of an illustrative process for identifying interests that are not commonly shared by the general population with the user, in accordance with some embodiments of the disclosure. It should be noted that process 800 or any step thereof could be performed on, or provided by, any of the devices shown in FIGS. 4-5. For example, process 800 may be executed by control circuitry 404 (FIG. 4) as instructed by a media guidance application implemented on user equipment 100 (which may have the functionality of any or all of user equipment 502, 504, and/or 506 (FIG. 5)). In addition, one or more steps of process 800 may be incorporated into or combined with one or more steps of any other process or embodiment (e.g., as described in relation to FIGS. 6-7 and 9-10). Many elements of process 800 have been described above with respect to FIG. 1, and those descriptions have full force and effect with respect to the below description of process 800, and thus details on previously-described elements are omitted for the sake of brevity.

Figure 9:
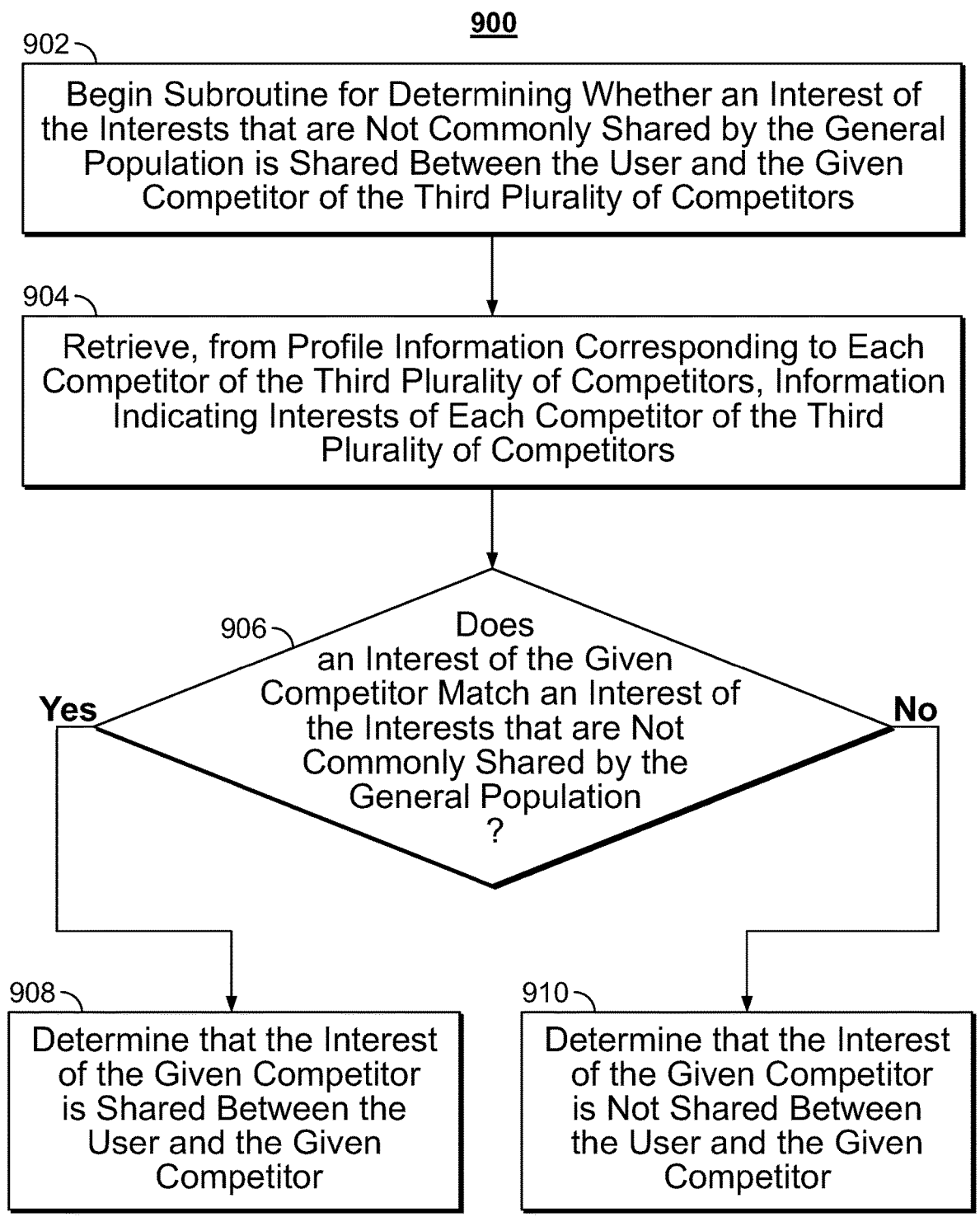
FIG. 9 depicts a flowchart of an illustrative process for determining whether an interest of the user that is not commonly shared by the general population is shared between the user and a competitor that the user is not otherwise interested in, in accordance with some embodiments of the disclosure.

Process 800 begins at 802, where control circuitry 404 begins a subroutine for identifying, from the information relating to the personal interests of the user, interests that are not commonly shared by the general population comprises, for each respective one of the personal interests of the user (e.g., a subroutine for executing 612 of process 600). At 804, control circuitry 404 determines a geographical region in which the user resides. At 806, control circuitry 404 defines the general population to consist of users whose profiles reflect that those users also reside within the geographical region. At 808, control circuitry 404 determines an amount of profiles of other users within the geographical region that share the respective personal interest (e.g., by referencing data entries in storage 408 or media guidance data source 518). At 810, control circuitry 404 determines whether the amount exceeds a threshold (the threshold being retrieved, e.g., from media guidance data source 518). If the determination is in the negative, process 800 continues to 812, where control circuitry 404 determines that the respective personal interest is not commonly shared by the general population. If the determination is in the affirmative, process 800 continues instead to 814, where control circuitry 404 determines that the respective personal interest is commonly shared by the general population FIG. 9 depicts a flowchart of an illustrative process for determining whether an interest of the user that is not commonly shared by the general population is shared between the user and a competitor that the user is not otherwise interested in, in accordance with some embodiments of the disclosure. It should be noted that process 900 or any step thereof could be performed on, or provided by, any of the devices shown in FIGS. 4-5. For example, process 900 may be executed by control circuitry 404 (FIG. 4) as instructed by a media guidance application implemented on user equipment 100 (which may have the functionality of any or all of user equipment 502, 504, and/or 506 (FIG. 5)). In addition, one or more steps of process 900 may be incorporated into or combined with one or more steps of any other process or embodiment (e.g., as described in relation to FIGS. 6-8 and 10). Many elements of process 900 have been described above with respect to FIG. 1, and those descriptions have full force and effect with respect to the below description of process 900, and thus details on previously-described elements are omitted for the sake of brevity.

Process 900 begins at 902, where control circuitry 404 begins a subroutine for determining whether an interest of the interests that are not commonly shared by the general population is shared between the user and the given competitor of the third plurality of competitors (e.g., a subroutine for executing 614 of process 600). At 904, control circuitry 404 retrieves, from profile information corresponding to each competitor of the third plurality of competitors (e.g., stored at storage 408 or media guidance data source 518), information indicating interests of each competitor of the third plurality of competitors. At 906, control circuitry 404 determines whether an interest of the given competitor matches an interest of the interests that are not commonly shared by the general population. If the determination is in the affirmative, process 900 continues to 908, where control circuitry 404 determines that the interest of the given competitor is shared between the user and the given competitor. If the determination is in the negative, process 900 continues to 910, where control circuitry 404 determines that the interest of the given competitor is not shared between the user and the given competitor.

Figure 10:
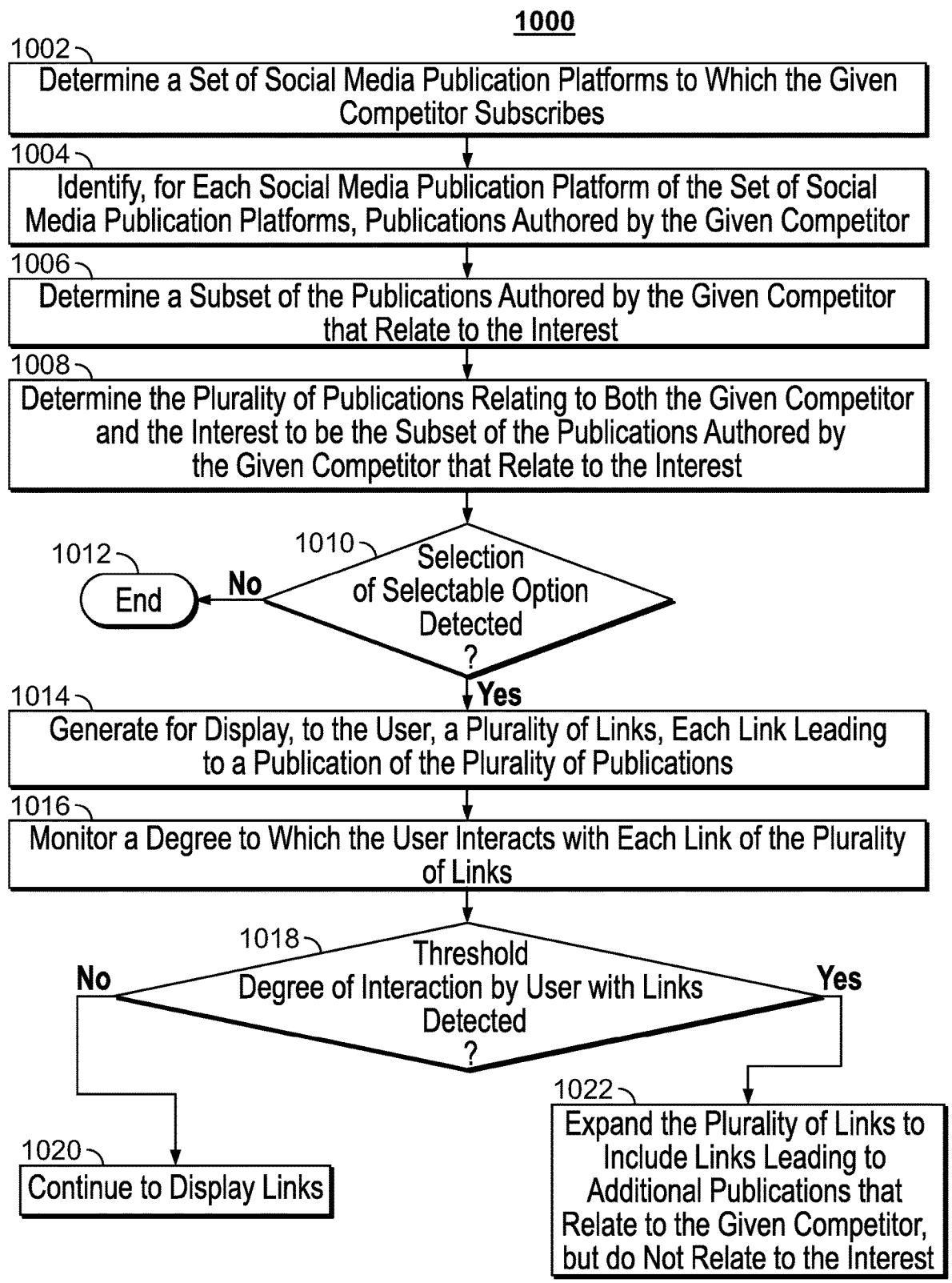
FIG. 10 depicts a flowchart of an illustrative process for selecting links to information about a competitor for display to a user based on a commonly shared interest between the user and the competitor, in accordance with some embodiments of the disclosure.

FIG. 10 depicts a flowchart of an illustrative process for selecting links to information about a competitor for display to a user based on a commonly shared interest between the user and the competitor, in accordance with some embodiments of the disclosure. It should be noted that process 1000 or any step thereof could be performed on, or provided by, any of the devices shown in FIGS. 4-5. For example, process 1000 may be executed by control circuitry 404 (FIG. 4) as instructed by a media guidance application implemented on user equipment 100 (which may have the functionality of any or all of user equipment 502, 504, and/or 506 (FIG. 5)). In addition, one or more steps of process 1000 may be incorporated into or combined with one or more steps of any other process or embodiment (e.g., as described in relation to FIGS. 6-9). Many elements of process 1000 have been described above with respect to FIG. 1, and those descriptions have full force and effect with respect to the below description of process 1000, and thus details on previously-described elements are omitted for the sake of brevity.

Process 1000 begins at 1002, where control circuitry 404 determines a set of social media publication platforms to which the given competitor subscribes. At 1004, control circuitry 404 identifies, for each social media publication platform of the set of social media publication platforms, publications authored by the given competitor. At 1006, control circuitry 404 determines a subset of the publications authored by the given competitor that relate to the interest. At 1008, control circuitry 404 determines the plurality of publications relating to both the given competitor and the interest to be the subset of the publications authored by the given competitor that relate to the interest.

At 1010, control circuitry 404 determines whether a selection of the selectable option (e.g., selectable option 104, or social media option 106) has been detected (e.g., by way of user input interface 410). If the determination is in the negative process 1000 ends at 1012. If the determination is in the affirmative, process 1000 continues to 1014, where control circuitry 404 generates for display, to the user (e.g., using display 412, which may be a display of user equipment 100 or any other user equipment such as wireless user communications device 506), a plurality of links, each link leading to a publication of the plurality of publications.

Optionally, at 1016, control circuitry 404 monitors a degree to which the user interacts with each link of the plurality of links, and at 1018, control circuitry 404 determines whether a threshold degree of interaction by user with links has been detected. If the determination is in the negative, process 1000 continues to 1020, where control circuitry 404 continues to generate for display the links. If the determination is in the affirmative, process 1000 continues to 1022, where control circuitry 404 expands the plurality of links to include links leading to additional publications that relate to the given competitor, but do not relate to the interest.

It should be noted that processes 600-1000 or any step thereof could be performed on, or provided by, any of the devices shows in FIGS. 1 and 4-5. For example, any of processes 600-1000 may be executed by control circuitry 404 (FIG. 4) as instructed by control circuitry implemented on user equipment 502, 504, 506 (FIG. 5), and/or a user equipment for selecting a recommendation. In addition, one or more steps of processes 600-1000 may be incorporated into or combined with one or more steps of any other process or embodiment.

It is contemplated that the steps or descriptions of each of FIGS. 6-10 may be used with any other embodiment of this disclosure. In addition, the steps and descriptions described in relation to FIGS. 6-10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-10.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, generating for display selectable option 104 may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update user interests recorded in a profile, stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for connecting a user with a sports competitor whose athletics the user is not interested in, but with whom the user shares a personal connection, the method comprising:
   determining that a user is viewing playback of a media asset comprising a sporting event;
   identifying a first plurality of competitors featured in the sporting event;
   retrieving, from a database comprising a profile of the sports preferences of the user, information identifying a second plurality of competitors in which the user is interested;
   determining, based on the first plurality of competitors and the second plurality of competitors, a third plurality of competitors that are competitors featured in the sporting event in which the user is not interested;
   retrieving, from a profile of personal interests of the user stored within the database, information relating to personal interests of the user;
   identifying, from the information relating to the personal interests of the user, interests that are not commonly shared by a general population;
   determining whether an interest of the interests that are not commonly shared by a general population is shared between the user and a given competitor of the third plurality of competitors; and
   in response to determining that the interest is shared between the user and the given competitor, generating for display to the user a selectable option to enable the user to perform an action associated with the given competitor.

2. The method of claim 1, wherein determining, based on the first plurality of competitors and the second plurality of competitors, the third plurality of competitors featured in the sporting event in which the user is not interested comprises:
determining a union between the first plurality of competitors and the second plurality of competitors; and
determining the third plurality of competitors to include each of the second plurality of competitors except for those competitors of the second plurality of competitors that are within the determined union.

3. The method of claim 1, wherein identifying, from the information relating to the personal interests of the user, interests that are not commonly shared by the general population comprises, for each respective one of the personal interests of the user:
determining an amount of profiles of other users that share the respective personal interest;
determining whether the amount exceeds a threshold; and
in response to determining that the amount does not exceed the threshold, determining that the respective personal interest is not commonly shared by the general population.

4. The method of claim 3, wherein the method further comprises:
determining a geographical region in which the user resides;
defining the general population to consist of users whose profiles reflect that those users also reside within the geographical region, and wherein determining the amount of profiles of other users that share the respective personal interest comprises limiting the other users to those users who are also reside within the geographical region.

5. The method of claim 1, wherein determining whether an interest of the interests that are not commonly shared by the general population is shared between the user and the given competitor of the third plurality of competitors comprises:
retrieving, from profile information corresponding to each competitor of the third plurality of competitors, information indicating interests of each competitor of the third plurality of competitors;
determining whether an interest of the given competitor matches an interest of the interests that are not commonly shared by the general population; and
in response to determining that the interest of the given competitor matches an interest of the interests that are not commonly shared by the general population, determining that the interest of the given competitor is shared between the user and the given competitor.

6. The method of claim 1, further comprising:
determining a plurality of publications relating to both the given competitor and the interest;
detecting a selection of the selectable option; and
in response to detecting the selection of the selectable option, generating for display, to the user, a plurality of links, each link leading to a publication of the plurality of publications.

7. The method of claim 6, further comprising:
monitoring a degree to which the user interacts with each link of the plurality of links; and
in response to determining that the degree to which the user interacts with each link of the plurality of links exceeds a threshold, expanding the plurality of links to include links leading to additional publications that relate to the given competitor, but do not relate to the interest.

8. The method of claim 6, wherein determining the plurality of publications comprises:

determining a set of social media publication platforms to which the given competitor subscribes;
identifying, for each social media publication platform of the set of social media publication platforms, publications authored by the given competitor;
determining a subset of the publications authored by the given competitor that relate to the interest; and
determining the plurality of publications relating to both the given competitor and the interest to be the subset of the publications authored by the given competitor that relate to the interest.

9. The method of claim 1, wherein identifying, from the information relating to the personal interest of the user, interests that are not commonly shared by the general population comprises determining a disability that has afflicted the user, wherein
determining whether an interest of the interests that are not commonly shared by the general population is shared between the user and the given competitor of the third plurality of competitors comprises:
accessing an injury report relating to injuries that have afflicted the third plurality of competitors; and
determining that an injury mentioned in the injury report matches the disability that has afflicted the user, and wherein the method further comprises:
receiving a selection of the selectable option; and
in response to receiving the selection of the selectable option, generating for display information relating to the given competitor's handling of the injury.

10. The method of claim 9, further comprising:
determining whether the given competitor overcame the injury;
in response to determining that the given competitor overcame the injury, determining a treatment for the injury that the given competitor had received; and
recommending the treatment to the user.

11. A system for connecting a user with a sports competitor whose athletics the user is not interested in, but with whom the user shares a personal connection, the system comprising:
communications circuitry; and
control circuitry configured to:
determine that a user is viewing playback of a media asset comprising a sporting event;
identify a first plurality of competitors featured in the sporting event;
retrieve, using the communications circuitry, from a database comprising a profile of the sports preferences of the user, information identifying a second plurality of competitors in which the user is interested;
determine, based on the first plurality of competitors and the second plurality of competitors, a third plurality of competitors that are competitors featured in the sporting event in which the user is not interested;
retrieve, using the communications circuitry, from a profile of personal interests of the user stored within the database, information relating to personal interests of the user;
identify, from the information relating to the personal interests of the user, interests that are not commonly shared by a general population;
determine whether an interest of the interests that are not commonly shared by a general population is shared between the user and a given competitor of the third plurality of competitors; and
in response to determining that the interest is shared between the user and the given competitor, generating for display to the user a selectable option to enable the user to perform an action associated with the given competitor.

12. The system of claim 11, wherein the control circuitry is further configured, when determining, based on the first plurality of competitors and the second plurality of competitors, the third plurality of competitors featured in the sporting event in which the user is not interested, to:
determine a union between the first plurality of competitors and the second plurality of competitors; and
determine the third plurality of competitors to include each of the second plurality of competitors except for those competitors of the second plurality of competitors that are within the determined union.

13. The system of claim 11, wherein the control circuitry is further configured, when identifying, from the information relating to the personal interests of the user, interests that are not commonly shared by the general population comprises, for each respective one of the personal interests of the user, to:
determine an amount of profiles of other users that share the respective personal interest;
determine whether the amount exceeds a threshold; and
in response to determining that the amount does not exceed the threshold, determine that the respective personal interest is not commonly shared by the general population.

14. The system of claim 13, wherein the control circuitry is further configured to:
determine a geographical region in which the user resides; and
define the general population to consist of users whose profiles reflect that those users also reside within the geographical region, and wherein the control circuitry is further configured, when determining the amount of profiles of other users that share the respective personal interest, to limit the other users to those users who are also reside within the geographical region.

15. The system of claim 11, wherein the control circuitry is further configured, when determining whether an interest of the interests that are not commonly shared by the general population is shared between the user and the given competitor of the third plurality of competitors, to:
retrieve, from profile information corresponding to each competitor of the third plurality of competitors, information indicating interests of each competitor of the third plurality of competitors;
determine whether an interest of the given competitor matches an interest of the interests that are not commonly shared by the general population; and
in response to determining that the interest of the given competitor matches an interest of the interests that are not commonly shared by the general population, determine that the interest of the given competitor is shared between the user and the given competitor.

16. The system of claim 11, wherein the control circuitry is further configured to:
determine a plurality of publications relating to both the given competitor and the interest;
detect a selection of the selectable option; and
in response to detecting the selection of the selectable option, generate for display, to the user, a plurality of links, each link leading to a publication of the plurality of publications.

17. The system of claim 16, wherein the control circuitry is further configured to:
monitor a degree to which the user interacts with each link of the plurality of links; and
in response to determining that the degree to which the user interacts with each link of the plurality of links exceeds a threshold, expand the plurality of links to include links leading to additional publications that relate to the given competitor, but do not relate to the interest.

18. The system of claim 16, wherein the control circuitry is further configured, when determining the plurality of publications, to:
determine a set of social media publication platforms to which the given competitor subscribes;
identify, for each social media publication platform of the set of social media publication platforms, publications authored by the given competitor;
determine a subset of the publications authored by the given competitor that relate to the interest; and
determine the plurality of publications relating to both the given competitor and the interest to be the subset of the publications authored by the given competitor that relate to the interest.

19. The system of claim 11, wherein the control circuitry is further configured, when identifying, from the information relating to the personal interest of the user, interests that are not commonly shared by the general population, to determine a disability that has afflicted the user, and wherein the control circuitry is further configured, when determining whether an interest of the interests that are not commonly shared by the general population is shared between the user and the given competitor of the third plurality of competitors, to:
access an injury report relating to injuries that have afflicted the third plurality of competitors; and
determine that an injury mentioned in the injury report matches the disability that has afflicted the user, and wherein the control circuitry is further configured to:
receive a selection of the selectable option; and
in response to receiving the selection of the selectable option, generate for display information relating to the given competitor's handling of the injury.

20. The system of claim 19, wherein the control circuitry is further configured to:
determine whether the given competitor overcame the injury;
in response to determining that the given competitor overcame the injury, determine a treatment for the injury that the given competitor had received; and
recommend the treatment to the user.

* * * * *